United States Patent Office 3,479,289
Patented Nov. 18, 1969

3,479,289
HIGH STRENGTH, SELF-LUBRICATING
MATERIALS
Jan W. Van Wyk, Kirkland, Wash., assignor to The
Boeing Company, Seattle, Wash., a corporation of
Delaware
No Drawing. Continuation-in-part of application Ser. No.
499,367, Oct. 21, 1965. This application Oct. 16, 1967,
Ser. No. 675,328
Int. Cl. C10m 7/06; F16d 69/02
U.S. Cl. 252—12                                        18 Claims

ABSTRACT OF THE DISCLOSURE

Compositions of matter, and methods for their fabrication by hot pressing, comprising a self-lubricating component of molybdenum disulfide; a carbonaceous component present in the form of metallic carbides, solid solutions of carbon, or both; and a carbide-forming metallic compound selected from the group consisting of molybdenum, niobium, tantalum, and tungsten. Other compositions of matter having, in addition, a strength enhancement compound of boron present in the form of a solid solution or a metallic compound which acts as a lubricant during the fabrication process selected from the group comprising iron, nickel, chromium and cobalt.

CROSS-REFERENCES TO RELATED APPLICATIONS

This application is a continuation-in-part of application Ser. No. 499,367 filed Oct. 21, 1965, for "Solid Lubricant Material," now abandoned.

BACKGOUND OF THE INVENTION

This invention relates to solid self-lubricating materials that, in addition to having low friction and low wear characteristics, also possess high strength properties. In addition, these self-lubricating materials exhibit various degrees of electrical conductivity ranging from what may be classified as electrical insulators to good electrical conductors depending upon the composition of the particular embodiment. These self-lubricating compositions may be used at high stress levels in air, vacuum, or inert atmospheres over a temperature range of from −420° F. to 2400° F.

Several self-lubricating solid materials are known in the prior art that posses good lubricating properties and low shear strength. Typical examples are molybdenum disulfide, molybdenum diselenide, tungsten disulfide, and graphite. Generally, these materials have suitable application where low friction characteristics are desired under low stress conditions. However, where high loading is imposed upon the system, these prior art materials cannot withstand the high stress conditions and their use under such circumstances results in early failure of the lubricating system. With the possible exception of graphite, these prior art solid self-lubricating materials have low tolerance to high temperatures and cannot be used in systems subject to more than a few hundred degrees Fahrenheit. Graphite alone amongst these prior art materials exhibits substantial electrical conductivity but it cannot be used in systems operating in vacuum for, under vacuum conditions, the graphite particles become abrasive in their effect.

Thus, while the prior art self-lubricating materials are suitable for a relatively limited range of applications, they cannot be used under more extreme operating conditions of high stress levels, high temperatures, and vacuum. Also, their electrical conductivity characteristics are primarily fixed for each particular material. Therefore, in order to provide lubrication for systems required to operate under more extreme conditions, the prior art self-lubricating materials cannot be employed and external lubrication must be provided. The disadvantages of external lubrication are self evident: high maintenance costs, contamination, evaporation, uneven application, etc. External lubrication is particularly difficult to use in systems tamination, evaporation, uneven application, etc. External lubrication is particularly difficult to use in systems possessing electrical, electronic, and optical elements that are required to operate in vacuum. While the extreme operating conditions mentioned above, for which prior art lubrication materials are not suited, were previously little encountered, such conditions are now typical in space technology and the need to provide lubricating materials to meet these severe operating conditions has become pressing.

SUMMARY

In their simplest form, the solid self-lubricating materials of this invention comprise three components:

(1) A self-lubricating component which provides lubricity to the final composition. The self-lubricating component may be either molybdenum disulfide or materials containing molybdenum disulfide.

(2) A refractory metal which provides high strength to the final composition and which forms a matrix with the self-lubricating material. The refractory metal may be selected from the group consisting of molybdenum, niobium, tantalum, or tungsten.

(3) Carbon, which combines with the refractory metal during the fabrication process to form carbides.

In addition to the foregoing components, the self-lubricating materials of this invention may also contain the following:

(1) An addition of boron in relatively small quantities in order to provide additional strength to the final composition.

(2) Another metal having a melting point substantially below the fabrication temperature. This metal may be selected from the group comprising iron, nickel, chromium, and cobalt, and it acts as a lubricant during the fabrication process, providing a final composition having a greater density than would otherwise result.

The high strength characteristics of the solid self-lubricating materials of this invention are provided primarily by the incorporation of a refractory metal within the composition so that, upon fabrication under pressure and at high temperature, the refractory metal combines with carbon present in the pressing dies to form carbides. Also contained within the composition is molybdenum disulfide, which provides lubricity. Thus, by combining high strength carbide-forming refractory metals with a self-lubricating material generally characterized as having low strength low temperature tolerance, a final composition possessing both exceptional compressive and flexural strengths, as well as low friction and wear characteristics, has been obtained. The compositions of matter of this invention can be either fabricated in their final form or they can be fabricated in bulk sizes and later machined to their final configuration. In either case, the compositions possess structural properties that enable them to be used under high stress levels, high temperatures, and in vacuum.

Even though molybdenum disulfide generally exhibits high electrical resistivity, its incorporation within the composition does not destroy the electrical conductivity contributed by the refractory metals. The electrical conductivity of the final composition depends upon which refractory metal or combination of refractory metals has been selected for incorporation into it. By varying the ingredients, a final composition may be obtained having any one of a wide range of electrical properties varying from what may be considered a good electrical insulator to a good electrical conductor.

It is, therefore, an object of this invention to provide a self-lubricating material having high compressive and flexural strength characteristics along with low friction and low wear properties.

It is a further object of this invention to provide a self-lubricating material having selectable high electrical conductivity characteristics as well as good structural properties.

It is another object of this invention to provide a self-lubricating material capable of withstanding high stress levels and temperatures and suitable for operation in a vacuum at temperatures up to 2400° F.

It is still another object of this invention to provide a self-lubricating material containing a relatively low melting point metal component that provides lubrication during the fabrication process.

DESCRIPTION OF THE PREFERRED EMBODIMENTS

The above objects of this invention are fulfilled by three classes of compositions of matter having the components, by various weight proportions, as follows:

(I) A first class of compositions comprising molybdenum disulfide or materials containing molybdenum disulfide; a carbide-forming metal selected from the group consisting of molybdenum, niobium, tantalum, tungsten, and combinations thereof; and a carbonaceous component present in the form of either metallic carbides or a solid solution of carbon, or both.

(II) A second class of compositions of matter comprising a self-lubricating material of molybdenum disulfide or materials containing molybdenum disulfide; a carbide-forming metal selected from the group consisting of molybdenum, niobium, tantalum, tungsten, and combinations thereof; a carbonaceous component in the form of either metallic carbides or a solid solution of carbon, or both; and a component of boron present in the form of either a solid solution of boron or free boron, or both.

(III) A third class of compositions of matter comprising a self-lubricating component of molybdenum disulfide or materials containing molybdenum disulfide; a carbide-forming metal selected from the group consisting of molybdenum, niobium, tantalum, tungsten, and combinations thereof; a carbonaceous component in the form of either metallic carbides or a solid solution of carbon, or both; a component of boron in the form of a solid solution of boron, free boron, or both; and a metal component having a melting point substantially lower than that of the carbide-forming metals selected from the group consisting of iron, nickel, chromium, cobalt, and combination thereof.

The above-described compositions of matter have been embodied in extensive example formulations enabling development of the following compositional ranges by weight percentages:

Class I

Composition 1
Constituent: Percentage by weight
    Molybdenum disulfide ($MoS_2$) _____ 20.0 to 97.0
    Carbon (C) _____ 0.01 to 10.0
    Molybdenum (Mo) _____ 0.01 to 80.0

Composition 2
Constituent:
    Molybdenum disulfide ($MoS_2$) _____ 20.0 to 97.0
    Carbon (C) _____ 0.01 to 10.0
    Niobium (Nb) _____ 0.01 to 80.0

Composition 3
Constituent:
    Molybdenum disulfide ($MoS_2$) _____ 20.0 to 97.0
    Carbon (C) _____ 0.01 to 10.0
    Tantalum (Ta) _____ 0.01 to 80.0

Composition 4
Constituent:
    Molybdenum disulfide ($MoS_2$) _____ 20.0 to 97.0
    Carbon (C) _____ 0.01 to 10.0
    Tungsten (W) _____ 0.01 to 80.0

Composition 5
Constituent:
    Molybdenum disulfide ($MoS_2$) _____ 20.0 to 97.0
    Carbon (C) _____ 0.01 to 10.0
    Molybdenum (Mo) _____ 0.01 to 80.0
    Tantalum (Ta) _____ 0.01 to 80.0

Composition 6
Constituent:
    Molybdenum disulfide ($MoS_2$) _____ 20.0 to 97.0
    Carbon (C) _____ 0.01 to 10.0
    Molybdenum (Mo) _____ 0.01 to 80.0
    Tungsten (W) _____ 0.01 to 80.0

Composition 7
Constituent:
    Molybdenum disulfide ($MoS_2$) _____ 20.0 to 97.0
    Carbon (C) _____ 0.01 to 10.0
    Molybdenum (Mo) _____ 0.01 to 80.0
    Niobium (Nb) _____ 0.01 to 80.0
    Tantalum (Ta) _____ 0.01 to 80.0
    Tungsten (W) _____ 0.01 to 80.0

Class II

Composition 1
Constituent: Percentage by weight
    Molybdenum disulfide ($MoS_2$) _____ 20.0 to 97.0
    Carbon (C) _____ 0.01 to 10.0
    Boron (B) _____ 0.01 to 5.0
    Molybdenum (Mo) _____ 0.01 to 80.0

Composition 2
Constituent:
    Molybdenum disulfide ($MoS_2$) _____ 20.0 to 97.0
    Carbon (C) _____ 0.01 to 10.0
    Boron (B) _____ 0.01 to 5.0
    Niobium (Nb) _____ 0.01 to 80.0

Composition 3
Constituent:
    Molybdenum disulfide ($MoS_2$) _____ 20.0 to 97.0
    Carbon (C) _____ 0.01 to 10.0
    Boron (B) _____ 0.01 to 5.0
    Tantalum (Ta) _____ 0.01 to 80.0
    Tungsten (W) _____ 0.01 to 80.0

Composition 4
Constituent: Percentage by weight
    Molybdenum disulfide ($MoS_2$) _____ 20.0 to 97.0
    Carbon (C) _____ 0.01 to 10.0
    Boron (B) _____ 0.01 to 5.0
    Niobium (Nb) _____ 0.01 to 80.0
    Tantalum (Ta) _____ 0.01 to 80.0
    Tungsten (W) _____ 0.01 to 80.0

Class III

Composition 1
Constituent: Percentage by weight
    Molybdenum disulfide ($MoS_2$) _____ 45.0 to 90.0
    Carbon (C) _____ 0.01 to 10.0
    Tantalum (Ta) _____ 2.0 to 55.0
    Iron (Fe) _____ 0.1 to 53.0

Composition 2
Constituent: Percentage by weight
    Molybdenum disulfide ($MoS_2$) _____ 45.0 to 90.0
    Carbon (C) _____ 0.01 to 5.0
    Tantalum (Ta) _____ 2.0 to 55.0
    Nickel (Ni) _____ 0.1 to 53.0

Composition 3
Constituent: Percentage by weight
    Molybdenum disulfide ($MoS_2$) _____ 45.0 to 90.0
    Carbon (C) _____ 0.01 to 10.0
    Tantalum (Ta) _____ 2.0 to 55.0
    Chromium (Cr) _____ 0.1 to 53.0

Composition 4

| Constituent: | Percentage by weight |
| --- | --- |
| Molybdenum disulfide ($MoS_2$) | 45.0 to 90.0 |
| Carbon (C) | 0.01 to 5.0 |
| Tantalum (Ta) | 2.0 to 55.0 |
| Cobalt (Co) | 0.1 to 53.0 |

From the foregoing table giving the compositions of this invention, it can be seen that all of the compositions contain molybdenum disulfide, which is primarily responsible for the self-lubricating properties of the final compositions. Other self-lubricating materials may be substituted for molybdenum disulfide in these compositions and a typical substitute would be tungsten disulfide. However, tungsten disulfide is considerably more expensive than molybdenum disulfide and tests performed upon compositions containing this material have shown that the resulting compositions do not possess properties superior to those containing molybdenum disulfide that would justify the increased cost.

The self-lubricating properties of molybdenum disulfide when used alone or in combination with other materials are well known in the art. The crystals of molybdenum disulfide exhibit a plate structure in which successive plates of molybdenum atoms are arranged with two successive layers of sulphur atoms between each layer of molybdenum atoms. A large crystal of molybdenum disulfide is, therefore, seen to be built up of layers of molybdenum attached by strong ionic linkages to adjacent layers of sulphur while the adjacent sulphur layers are held together by weak homopolar linkage bonds.

While the sulphur layers have only a weak attraction for each other in forming a complete crystal of molybdenum disulfide, the sulphur atoms have a much greater affinity for metals, and the molybdenum disulfide plates will attach themselves under certain conditions quite firmly to metals. The sulphur atoms, having weak affinity for each other, will not be held by as great a force as those holding the sulphur to the metal, nor even as great as the metal-to-metal adhesive forces. Therefore, the sulphide present serves as a lubricating mechanism and, because of this lubricating mechanism, molybdenum disulfide is often said to possess "smear" lubrication or lubricant transfer characteristics. By this is meant that when a material containing molybdenum disulfide is brought into sliding contact with a metal not containing that composition, the weak bond between the sulphur atoms of the molybdenum disulfide crystals will yield to the greater forces existing between the sulphur atoms and the atoms of the new metal. By this method, some of the molybdenum disulfide will be smeared or transferred to the new metal surface. This lubricant transfer mechanism is found in all of the compositions of this invention and is particularly important in vacuum applications.

Lubrication problems in a vacuum may seem, on first analysis, to be no different than those in air, but actually vacuum conditions imposed more serious problems and more rapid wear on any assembly than does operation in air. Any assembly, formed of metal and operated in a vacuum, behaves differently than the same assembly operated in air. It has been found that the absence of an oxide film on the surfaces of the assembly members causes cohesion of metal between the several parts of the assembly while operating in the vacuum. The metal will adhere or cohere with other metallic surfaces as cohesive contact is made and broken with the other metallic surfaces during operation. The transfer of metal particles from one surface to the other occurs rapidly and visible pitting will be evident after a short period of operation. This results in the metal surfaces becoming rough, thus increasing the noise level and also increasing the required operating power. In air this cohesion which causes the roughening of a bearing in a vacuum does not take place due to the presence of an oxide film on the surfaces of the metal.

If a normal lubricant is introduced onto the surfaces of the metal assemblies operating in a vacuum condition, the lubricant will evaporate due to its high vapor pressure. Thus, after a short period of operation, the lubricant will have become nonexistent. The use of a self-lubricating material such as molybdenum disulfide in assemblies operating under vacuum conditions alleviates the problems posed by cohesive erosion. Each time the molybdenum disulfide comes into contact with a mating metal surface, a minute quantity of the molybdenum disulfide is transferred to the mating metal surface, thus preventing cohesive erosion. In this manner, the molybdenum disulfide performs somewhat the same function in vacuum conditions as the oxide surface film does under atmospheric conditions. However, even beyond this, the molybdenum disulfide exhibits greater lubrication properties than the oxide surface films and in assemblies operating in air the introduction of molybdenum disulfide as a lubricant greatly reduces the coefficient of friction between the mating surfaces.

From the foregoing discussion, it is apparent that the use of molybdenum disulfide as a self-lubricant material in mechanical assemblies operating in either vacuum or air is highly desirable. However, the implementation of this lubricant has posed serious problems. While molybdenum disulfide exhibits considerable stability over a wide range of operating temperatures, this material lacks many of the metallic properties essential to mechanical applications including ductility, compressive strength, tensile strength, malleability, shock resistance, and resistance to brittle failure.

In order to extend the range of application of molybdenum disulfide, considerable effort has been expended by the industry to develop a suitable matrix for suspending the molybdenum disulfide therein. This matrix, in order to be successful, must lend the above mechanical properties to the composition plus allowing the molybdenum disulfide to impart its lubricity, lubricant transfer, and high temperature characteristics to the resulting composition. An example of a matrix that was developed to obtain these ends can be found in U.S. Patent No. 3,239,-288 issued to Campbell and Van Wyk on Mar. 8, 1966. In that patent, molybdenum disulfide was combined with iron to yield a resulting composition that retained the lubricity characteristics of molybdenum disulfide and also many of the structural characteristcis of iron. Unfortunately, the iron also retained some of its undesirable characteristics in the resulting composition; namely, its susceptibility to oxidation which had the effect of limiting the range of application in which the resulting composition could be used. Replacing the iron with nickel, as is also taught in that patent, alleviated many of the difficulties associated with the use of iron, but even the use of nickel did not permit an exploitation of the full range of characteristics indigenous to molybdenum disulfide.

I performed considerable research work to explore the maximum temperature at which molybdenum disulfide could be sintered without causing a disassociation of the molybdenum disulfide during the sintering operation. I discovered that if a pressure of 5000 p.s.i. was applied to the molybdenum disulfide during sintering, that disassociation of this material could be prevented at temperatures up to 3300° F. This result was unexpected inasmuch as molybdenum disulfide normally disassociates at a temperature of between 2000° F. and 2200° F. at atmospheric pressure. After discovering this unexpected ability of molybdenum disulfide to withstand high sintering temperatures, it was clear that the full capabilities of this material could not be realized by using either iron or nickel as a binder in the matrix.

These objectives have been achieved by the compositions of matter of this invention employing molybdenum disulfide as a lubricating mechanism and a refractory metal as a binder for the matrix. Chemical analyses of these compositions indicate that when graphite dies are used for the fabrication of these compositions at high temperatures and pressures, carbon from the dies unites with the refractory metal and produces a carbide. Further investigation showed that the hard carbide particles of the self-lubricating compositions were coated with a relatively soft layer of molybdenum disulfide. This unexpected metallurgical configuration appears to be primarily responsible for the extremely low wear rates exhibited by these compositions. In addition, certain of these compositions exhibit capabilities of sustaning compression loads in excess of 250,000 p.s.i. while others may be operated at sliding surface speeds of 12,000 feet per minute. The temperature range over which these materials can be used is also impressive. Many of these compositions can be operated up to 750° F. in air and up to 2400° F. in vacuum. As for low temperature capability, operation in liquid hydrogen at −420° F. has been demonstrated. These compositions have been shown to possess unique electrical properties. Compositions which can be either characterized as good conductors of electrical current or as good insulators may be fabricated and control of the electrical properties can be accomplished by varying the composition of the metal matrix selected. These results can be obtained even though molybdenum disulfide does not of itself possess good electrical conductivity and is, in fact, characterized by such a high degree of electrical resistivity that it serves as an insulating medium in many systems where it is desired to prevent electrical conduction. It should also be noted that the refractory metals used in these compositions are not noted for their electrical conductivity and that while carbon-graphite is generally known to have low electrical resistivity, it often exhibits directional properties to electrical conductivity. However, the metallic carbides formed in the matrix of the compositions of this invention do not exhibit directional properties and have the unexpected result when combined with the highly insulative medium of molybdenum disulfide of exhibiting excellent electrical conductivity.

In the compositions of the second class of this invention, small additions of boron, up to 5 percent by weight, have been added to the matrix in order to further enhance its structural properties. The boron constituent is felt to enter the matrix as a solid solution with the possibility of some metallic borite being formed. Relatively small boron additions of approximately one percent by weight were seen to significantly increase the ultimate compressive strength of some composites while additions of boron in excess of 5 percent by weight resulted in decreased compressive strength. In addition, there is some evidence that the boron component acts as a lubricant during the fabrication process, thus yielding a composite with a greater degree of compaction than would otherwise be obtainable.

In addition to the constituent of molybdenum disulfide, carbon, and tantalum, the compositions of Class III of this invention contain an additional metal component selected from the group consisting of iron, nickel, chromium and cobalt. The primary purpose of including these metals in the matrix is to provide lubrication during the fabrication process. These metals possess melting points considerably below that of the carbide-forming metals and their presence does not significantly add to the structural properties of the resulting matrix. Their primary function is to act as a lubricant during the fabrication process in order that greater compaction of the resulting matrix may be obtained. It must be recognized that certain limitations may be imposed upon the Class III compositions due to the inclusion of these components. In particular, the Class III compositions are not able to survive the high temperature application that the Class I and Class II compositions can withstand. Also, those Class III compositions containing nickel and chromium exhibited considerably higher wear rates than did the Class I and Class II compositions. During the fabrication of the Class III compositions, the iron, nickel, chromium or cobalt are in a molten state. It has been discovered that because of the high pressures applied during fabrication, these molten metals are squeezed to the outside edges of the composition and come into contact with the dies. Some reactions occur between the molten metal and the graphite dies which accelerate the wear on the dies causing damage thereto and preventing their use for more than three or four fabrication operations. Thus, the compositions of Class III should not be used where the production of many identical parts is desired.

The following procedures of fabricating the compositions of matter set for in this specification are presented as representative practices of hot pressing or compacting the composite and these procedures are meant to be illustrative of any of several techniques capable of fabricating the materials of the instant invention. These procedures are meant in no way to be a limitation upon the compositions of matter disclosed herein because it is envisioned that many variations can be employed without significant effect upon the ultimate properties of the compositions.

The self-lubricating component of molybdenum disulfide can be employed in powder form in a wide range of sizes but a range of from 7 to 64 microns has been successfully used in the fabrication of these compositions. The molybdenum disulfide powder employed as a self-lubricating component has been analyzed and found to contain, in addition to the molybdenum disulfide, a petroleum base oil ranging from 0.02 to 0.05 percent by weight. The petroleum oil is felt to be a contributor of carbon to the final compositions. The metallic powders, molybdenum, tantalum, niobium, and tungsten used in the Class I compositions; as well as boron used in Class II compositions; and iron, nickel, chromium, and cobalt used in the Class III compositions are obtained from commercial supplies and have a 99.9 percent plus purity. While all of the metallic powders were obtained in a 325 mesh particle size, it is envisioned that any particle size that is capable of being sintered could be easily used in the practice of fabricating these compositions.

After weighing appropriate amounts of the components to be used, the metallic powders, if more than one metallic component is being used, are first blended together before being mixed with the molybdenum disulfide component. For mixing the metallic powders with the molybdenum disulfide, the following techniques have produced satisfactory compositions:

(1) *Screening.*—The powder mixture is passed through a 100 mesh screen into collective pans, transferred to a container, and the screening procedure repeated two more times. The powder is then transferred to the graphite die.

(2) *Automatic mortar.*—The powder mixture is loaded into an alumina mortar and a quantity of acetone sufficient to provide a free flowing slurry is added to it. An alumina pestle is positioned into the mortar and automatic mixing is started. Mixing is continued for 20 minutes with periodic addition of acetone to maintain the slurry, but during the final five minutes of automatic mixing, no acetone is added so that the mixture will be worked into a thick paste. The paste mixture is removed from the mortar with a spatula and dried in a vacuum oven at approximately 29 inches of mercury at 200° F. for one hour. The dried powder is then passed through an 80 mesh screen and placed into a graphite die.

The graphite die used in the sintering procedure is made of "ATJ" graphite made by the National Carbon Corporation. Another graphite material used is "Graph-I-Tite," Grade G, made by the Basic Carbon Corporation. The graphite die provides the source of carbon which enters into the final composition to form carbides with the refractory metals. The amount of carbon entering into the final composition is controlled by the length of time of the hot pressing operation.

For the hot pressing operation, the powder mixture is placed into the graphite die and, by means of a typical induction heating coil, the die assembly is initially brought to a temperature of 300° F. and held there for a period sufficiently long to drive off any water vapor that may be contained within the powder. The duration of the drying period is not critical and normally lasts for about five minutes.

Continuing, the following steps are applicable for the fabrication of the Class I and Class II compositions of this invention. Those steps applicable to the fabrication of the Class III compositions will be detailed later. After the die assembly has been held at 300° F. for approximately five minutes to drive off any included water vapor, the temperature of the die assembly is increased to a range of from 2500° F. to 3200° F. and a press load of between 1000 p.s.i. to 9000 p.s.i. is applied to the graphite die containing the Class I or Class II powder mixture by means of a hydraulic cylinder or dead weight lever system. This pressure is applied in a two-step manner as follows:

First, one-half of the final intended press load is applied and held until the temperature of the assembly has been increased to the sintering temperature. This usually requires about 20 minutes, the exact time being dependent upon the size of the dies and the power of the induction heating apparatus. When the sintering temperature has been reached, the full press load is applied and held for a period that may be as long as 30 minutes. The duration of the full press load application determines the grain size and carbon content of the final composition with longer durations yielding larger grain sizes and higher carbon contents. Good sintering results have been obtained with the full press load being applied for a period of ten minutes.

In the case of fabricating the Class III compositions of this invention, after the die assembly has been held at 300° F. for approximately five minutes in order to drive off the water vapor, a load of between 1000 p.s.i. and 7000 p.s.i. is applied to the die assembly by means of a hydraulic cylinder or a dead weight lever system. After application of the load, the temperature is increased to the range of from 2000° F. to 2700° F. within a time period of between two and ten minutes, the exact time being dependent on the power available as well as the size of the die. Upon reaching the sintering temperature, the temperature is maintained for from two to ten minutes.

After the sintering of either the Class I and Class II compositions or the Class III compositions has been completed, the power to the induction heating apparatus is removed and the die assembly permitted to cool to room temperature. The load may be removed from the dies immediately after power cutoff if there is danger of shattering or other destruction during cooling due to the difference in the thermal expansion of the compositions and the die. If no such danger exists, the load is generally not removed until the die assembly has cooled to a temperature of approximately 300° F. in order to achieve a more solid compact material.

In all cases, before and during the hot pressing operation, the induction furnace is purged with argon, nitrogen, or other inert gas, thus insuring an inert atmosphere around the die which prevents oxidation of the powder mixture and of the die itself.

Detailed below are specific example formulations of the compositions of this invention along with some of their physical and electrical properties. The manner in which these properties were measured will be described later.

*Example 1.*—The following material, typical of Composition 1, Class I, was hot pressed under a pressure of 5000 p.s.i. at a temperature of 3200° F. as described above.

Constituent: Percentage by weight
    Molybdenum disulfide ($MoS_2$) _____ 79.3
    Carbon (C) _____ 0.9
    Molybdenum (Mo) _____ 19.8

Tests performed upon examples of Composition 1, Class I, indicate that the physical and electrical properties of this material are somewhat dependent upon variations in the fabrication process to an extent not otherwise observed for other compositions of this invention. Nevertheless, this example was found to possess exceptionally good wear characteristics with a value of $1 \times 10^{-5}$ inches$^3$/100 minutes being recorded where the test specimen originally present a line contact to the test surface which moved at a surface velocity of 900 feet/minute. The test sample exhibited an ultimate compressive strength in excess of 43,000 p.s.i. and a coefficient of friction of 0.07. The electrical characteristics of this example showed an electrical resistivity of $1.5 \times 10^{-4}$ ohm/centimeter. From these measurements, it can be seen that this embodiment of the invention would find particular application where low wear characteristics were of primary importance and friction and electrical conductivity characteristics were of lesser importance.

*Example 2.*—The following material, typical of Composition 2, Class I, was hot pressed under a pressure of 5000 p.s.i. at a temperature of 3000° F. as described above.

Constituent: Percentage by weight
    Molybdenum disulfiide ($MoS^2$) _____ 69.8
    Carbon (C) _____ 0.6
    Niobium (Nb) _____ 29.6

Compositional analysis performed upon extensive formulations of Composition 2, Class I, indicates that those samples having higher percentages of molybdenum disulfide exhibit higher carbon contents, thus verifying that a portion of the moldybdenum disulfide is transformed during the fabrication process into molybdenum carbide. Those samples having low weight percentages of molybdenum disulfide, i.e., 30 to 50 percent, exhibit a very low electrical resistivity of $1.2 \times 10^{-4}$ ohm/centimeter. The particular example described here exhibits a high ultimate compressive strength of 137,000 p.s.i. with a low coefficient of friction of 0.045. Suitable applications for this material include those where low friction characteristics are desired under high loading conditions.

*Example 3.*—The following material, typical of Composition 3, Class I, was hot pressed under a pressure of 5000 p.s.i. as described above.

Constituent: Percentage by weight
    Molybdenum disulfied ($MoS_2$) _____ 79.2
    Carbon (C) _____ 1.0
    Tantalum (Ta) _____ 19.8

The ultimate compressive strength of this example was found to be somewhat dependent upon the temperature at which the material was hot pressed. For example, in the case of a material having a composition according to this example and being hot pressed at a temperature of 2500° F., a relatively low ultimate compressive strength of 5800 p.s.i. was measured. Another test sample otherwise identical except for a hot pressing temperature of 3000° F. exhibited an ultimate compressive strength of 24,000 p.s.i. Both of the test samples exhibited an electrical resistivity of approximately $3.1 \times 10^{-4}$ ohm/centimeter.

*Example 4.*—The following material, typical of Composition 3, Class I, was hot pressed under a pressure of 5000 p.s.i. at 2700° F. as described above.

Constituent: Percentage by weight
    Molybdenum disulfide ($MoS_2$) _____ 69.3
    Carbon (C) _____ 1.0
    Tantalum (Ta) _____ 29.7

This example is noteworthy because it exhibits exceptionally good friction and wear characteristics when used against an alloy of titanium containing 6% aluminum and 4% vanadium. This example exhibits an ultimate flexural strength of 13,625 p.s.i. and has a coefficient of friction ranging between 0.19 to 0.25 at low surface velocities. At higher surface velocities (1500 feet/minute) the coefficient of friction is from 0.04 to 0.08. In further tests conducted on this example, a ball separator was fabricated of this material to accommodate a 20 mm. bore ball bearing assembly. The bearing was operated at 3450 r.p.m. in air at room temperature with a 10 lb. axial load applied. After 10,088 hours of such operation, the separator, as well as the bearing assembly, exhibited extremely little wear.

*Example 5.*—The following material, typical of Composition 4, Class I, was hot pressed under a pressure of 5000 p.s.i. at 3200 F. as described above.

Constituent: Percentage by weight
    Molybdenum disulfide ($MoS_2$) _____ 79.1
    Carbon (C) _____ 1.1
    Tungsten (W) _____ 19.8

Generally, formulations of Composition 4, Class I having high molybdenum disulfide content (approximately 80% by weight) exhibit the highest electrical resistivity of any of the formulations of this invention. Thus, even though one of the primary desirable characteristics of this invention is the provision of a self-lubricating material possessing a high degree of electrical conductivity, the electrical conductivity may be modified by selecting appropriate formulations. Such a procedure would find suitable application in fabricating an electrical switch having low friction sliding contacts by alternating the formulation of the selected contacts. Thus, alternate contacts would exhibit high and low electrical conductivity properties which would provide a switching function through high and low electrical conductivity paths. The particular example given here exhibits a relatively high electrical resistivity of greater than $4,100 \times 10^{-4}$ ohm/centimeter which was accompanied by a reasonably low coefficient of friction of 0.07. This material would be suitable for low friction, low electrical conductivity applications.

*Example 6.*—The following material, typical of Composition 4, Class I, was formulated by hot pressing under a pressure of 5000 p.s.i. at a temperature of 3200° F. as described above.

Constituent: Percentage by weight
    Molybdenum disulfide ($MoS_2$) _____ 19.9
    Carbon (C) _____ 0.2
    Tungsten (W) _____ 79.9

This example contains a high metallic tungsten content and from the well-known, good high temperature characteristics of tungsten, it can be expected that this material will also exhibit excellent high temperature properties. This example has an ultimate flexural strength of 29,000 p.s.i. and an electrical resistivity of $0.33 \times 10^{-4}$ ohm/centimeter.

*Example 7.*—The following material, typical of Composition 5, Class I, was hot pressed under a pressure of 8000 p.s.i. at 2800° F. as described above.

Constituent: Percentage by weight
    Molybdenum disulfide ($MoS_2$) _____ 79.1
    Carbon (C) _____ 1.2
    Molybdenum (Mo) _____ 14.8
    Tantalum (Ta) _____ 4.9

This material has exceptional sliding friction characteristics when used in conjunction with a copper surface. The lubricant transfer or "smear" lubrication performance was exceedingly good and because of the relatively high carbide content, excess of the transferred lubricant was removed from the mating copper surface. Its electrical resistivity is $14.9 \times 10^{-4}$ ohm/centimeter. Accordingly, this material will have successful application to sliding electrical contacts or to electrical motor brushes used in conjunction with a copper commutator.

*Example 8.*—The following material, typical of Composition 5, Class I, was hot pressed under a pressure of 9000 p.s.i. at 2650° F. as described above.

Constituent: Percentage by weight
    Molybdenum disulfide ($MoS_2$) _____ 44.7
    Carbon (C) _____ 0.7
    Molybdenum (Mo) _____ 14.9
    Tantalum (Ta) _____ 39.7

This example exhibits excellent performance as a self-lubricating material at high stress levels and at high surface velocities. In addition, relatively constant low friction characteristics were apparent over a considerable range of stress levels. A self-lubricating material fabricated according to this formulation can be successfully applied when used as a sleeve bearing or as a spherical bearing. These exceptional wear characteristics were demonstrated by fabricating a 0.75 inch diameter spherical bearing and testing it in air at 70° F. The bearing was oscillated through an angle of $\pm 7\frac{1}{2}°$ at a rate of 200 cycles/minute while supporting a load of 2000 p.s.i. After completing $10 \times 10^6$ cycles, the measured wear on the spherical bearing was only 0.023 inch. The electrical resistivity of this material is $1.23 \times 10^{-4}$ ohm/centimeter.

*Example 9.*—The following material, typical of Composition 6, Class I, was hot pressed under a pressure of 5000 p.s.i. at 2700° F. as described above.

Constituent: Percentage by weight
    Molybdenum disulfide ($MoS_2$) _____ 49.6
    Carbon (C) _____ 0.9
    Molybdenum (Mo) _____ 39.6
    Tungsten (W) _____ 9.9

By varying the weight percentage of the molybdenum disulfide component of Composition 6, Class I, formulations from approximately 40 to 95%, the electrical resistivity can be varied continuously, but in a nonlinear fashion, from $1.1 \times 10^{-4}$ ohm/centimeter to $3.1 \times 10^{-4}$ ohm/centimeter, respectively. In this manner, control over the electrical resistivity characteristics can be exercised by controlling the composition of the composite and the self-lubricating properties characteristic of this invention can be retained. The electrical resistivity of the example given here is $1.1 \times 10^{-4}$ ohm/centimeter and the wear and friction characteristics of this material were found to be commendably low.

*Example 10.*—The following material, typical of Composition 6, Class I, was hot pressed under a pressure of 5000 p.s.i. at 3200° F. as described above.

Constituent: Percentage by weight
    Molybdenum disulfide ($MoS_2$) _____ 79.1
    Carbon (C) _____ 1.1
    Molybdenum (Mo) _____ 13.9
    Tungsten (W) _____ 5.9

This material has an electrical resistivity of $3.1 \times 10^{-4}$ ohm/centimeter and represents a self-lubricating material that is comparatively inexpensive to fabricate. Thus, this material would be a logical choice for low cost applications.

*Example 11.*—The following material, typical of Composition 7, Class I, was hot pressed under a pressure of 5000 p.s.i. at 2750° F. as described above.

Constituent: Percentage by weight
    Molybdenum disulfide ($MoS_2$) _____ 39.8
    Carbon (C) _____ 0.5
    Molybdenum (Mo) _____ 14.9
    Niobium (Nb) _____ 14.9
    Tantalum (Ta) _____ 14.9
    Tungsten (W) _____ 14.9

Generally, the formulations of Composition 5, Class I, exhibited wide variations in electrical resistivity with resistivities of from $0.41 \times 10^{-4}$ ohm/centimeter to $17.0 \times 10^{-4}$ ohm/centimeter being measured in particular samples. These variations in electrical resistivity appear to be related to the weight percentage of tungsten embodied therein with those formulations having a higher tungsten content exhibiting the higher electrical resistivities. The particular example set forth here has an electrical resistivity of $0.41 \times 10^{-4}$ ohm/centimeter and possesses a relatively high coefficient of friction of 0.14 accompanied with a very low wear rate. These friction and wear rate characteristics, together with a high ultimate compressive strength of 188,000 p.s.i., indicate that this example would find suitable application in high stress level, high temperature braking devices.

*Example 12.*—The following material, typical of Composition 1, Class II, was hot pressed under a pressure of 5000 p.s.i. at 2900° F. as described above.

| Constituent: | Percentage by weight |
|---|---|
| Molybdenum disulfide ($MoS_2$) | 79.2 |
| Carbon (C) | 1.0 |
| Boron (B) | 0.5 |
| Molybdenum (Mo) | 19.3 |

This example exhibited an exceptionally low wear rate of $1.8 \times 10^{-5}$ inches³/100 minutes where the specimen was originally set in line contact with a stainless steel test surface moving at a surface velocity of 900 feet/minute. This compares with a wear rate of $6.1 \times 10^{-3}$ inches³/100 minutes measured for other examples of Composition 1, Class II materials.

*Example 13.*—The following material, typical of Composition 2, Class II, was hot pressed under a pressure of 5000 p.s.i. at 2750° F. as described above.

| Constituent: | Percentage by weight |
|---|---|
| Molybdenum Disulfide ($MoS_2$) | 29.8 |
| Carbon (C) | 0.7 |
| Boron (B) | 0.5 |
| Niobium (Nb) | 69.0 |

Small quantites of boron, in the order of one-half of 1% present in Compostion 2, Class II, formulations produce a self-lubricating material exhibiting exceptionally high ultimate compressive strength. In an example of Composition 2, Class II, material having 20% by weight molybdenium disulfide, a one-half of 1% by weight of boron produced a formulation having an ultimate compressive strength in excess of 250,000 p.s.i. Larger additions of boron, however, considerably lowered the ultimate compressive strength: an example with the same weight percentage of moylbdenum disulfide but having 5% by weight of boron produced an ultimate comprehensive strength of 115,000 p.s.i. In the example described here, tests showed that this material possessed a relatively high ultimate compressive strength of 246,000 p.s.i. and a coefficient of friction of 0.042. The high niobium content of this example is felt to be responsible for the high ultimate flexural strength which measured 45,000 p.s.i. The electrical resistivity of this example measured $0.33 \times 10^{-4}$ ohm/centimeter. From these measurements, it is apparent that this material is particularly suited for applications requiring endurance to very high stress levels and where a reasonable degree of electrical conductivity is desired.

*Example 14.*—The following material, typical of Composition 3, Class II, was hot pressed under a pressure of 5000 p.s.i. at 3000° F. as described above.

| Constituent: | Percentage by weight |
|---|---|
| Molybdenum disulfide ($MoS_2$) | 90.2 |
| Carbon (C) | 0.9 |
| Boron (B) | 3.0 |
| Tantalum (Ta) | 3.0 |
| Tungsten (W) | 3.0 |

Laboratory evaluation of this example indicates that this material possesses a very low coefficient of friction of 0.025, thus making it suitable for varying surfaces subjected to high surface velocities. The electrical resistivity of this example was somewhat higher than most other compositions of this invention and was measured at $25.5 \times 10^{-4}$ ohm/centimeter.

*Example 15.*—The following material, typical of Composition 4, Class II, was hot pressed under a pressure of 5000 p.s.i. at 3000° F. as described above.

| Constituent: | Percentage by weight |
|---|---|
| Molybdenum disulfide ($MoS_2$) | 91.2 |
| Carbon (C) | 0.9 |
| Boron (B) | 0.5 |
| Niobium (Nb) | 2.0 |
| Tantalum (Ta) | 3.5 |
| Tungsten (W) | 2.0 |

Friction measurements made upon various formulations of Composition 4, Class II, showed that the coefficient of friction remained relatively constant even though the fabrication temperature and molybdenum disulfide content were varied. The coefficient of friction of the example given here measures 0.032 and it is expected that this value will remain considerably stable over a wide range of operating conditions. This example has an electrical resistivity of $8.1 \times 10^{-4}$ ohm/centimeter.

*Example 16.*—The following material, typical of Composition 4, Class II, was hot pressed under a pressure of 5000 p.s.i. at 2750° F. as described above.

| Constituent: | Percentage by weight |
|---|---|
| Molybdenum disulfide ($MoS_2$) | 39.8 |
| Carbon (C) | 0.5 |
| Boron (B) | 4.0 |
| Niobium (Nb) | 18.6 |
| Tantalum (Ta) | 18.6 |
| Tungsten (W) | 18.6 |

This example has a coefficient of friction of 0.050 and an electrical resistivity of $0.86 \times 10^{-4}$ ohm/centimeter. Other tests indicate that this material would find important application in devices required to operate in extreme conditions of temperature, pressure, and other environmental factors.

*Example 17.*—The following material, typical of Composition 1, Class III, was hot pressed under a pressure of 5000 p.s.i. at approximately 2350° F. as described above.

| Constituent: | Percentage by weight |
|---|---|
| Molybdenum disulfide ($MoS_2$) | 90.0 |
| Carbon (C) | 0.2 |
| Tantalum (Ta) | 5.0 |
| Iron (Fe) | 4.8 |

*Example 18.*—The following material, typical of Composition 1, Class III, was hot pressed under a pressure of 5000 p.s.i. at approximately 2350° F. as described above.

| Constituent: | Percentage by weight |
|---|---|
| Molybdenum disulfide ($MoS_2$) | 45.0 |
| Carbon (C) | 0.4 |
| Tantalum (Ta) | 50.0 |
| Iron (Fe) | 4.6 |

In Examples 17 and 18, the iron component is not present in the matrix as a binder but rather as a processing lubricant so that during the hot pressing of the composition the iron becomes molten and permits the granules of the other constituents to compact into a dense mass. Other lubricants that have also been found to contribute to matrix density include nickel, chromium and cobalt; and numerous other examples could be given showing compositions containing those constituents. Generally, the compositions given in Examples 17 and 18 exhibit a wear rate that is higher than most all of the Class I and Class II compositions.

X-ray diffraction studies made upon Composition 3, Class I, indicate that this molybdenum disulfide, carbon, tantalum composition has a structure that appears to be a cemented conglomerate composed of at least four phases. These phases, in the order of their optical reflectivity, appear as follows in the unetched condition:

Phase 1 is a bright lacy network showing no grain structure and a microprobe indicates that this phase is rich in molybdenum disulfide.

Phase 2 is composed of light gray areas which are nearly oval in shape and are normally surrounded by phase 3 material and include irregular inclusions of phase 4 material. The microprobe indicates that the phase 2 areas are rich in tantalum and this phase also shows no grain structure.

Phase 3 is a dark gray area in the total composition with a fine grain structure and polishing indicates that these areas are soft and easily fractured intergranularly. The microprobe indicates that these areas have a varying richness in molybdenum disulfide.

Phase 4 of this composition is a very dark gray area of irregular shape and of relatively small size. The chemical composition of this phase could not be determined by the microprobe because of the smallness and irregularity of the shape of these areas. Generally, a cross-section of this composition exhibits a fairly uniform distribution of molybdenum disulfide and tantalum.

X-ray diffraction studies were also made of the Class III compositions containing the four components of molybdenum disulfide, carbon, tantalum and another metal selected from the group comprising iron, nickel, chromium, and cobalt. These compositions showed a structure consisting of at least three phases, the first being a lighter area having a network of molybdenum disulfide surrounded by narrow, oval areas of a second phase rich in tantalum. The tantalum-rich areas show extensive grain development similar to a metallic material. The distribution of the other metals (iron, nickel, chromium, or cobalt) appears to follow the molybdenum disulfide areas. The third phase appears as a small light area of irregular shape having a composition that could not be exactly determined.

The physical properties of the examples of the compositions of this invention discussed herein were measured in the following manner:

*Flexural tests.*—Flexural tests were conducted using a Tinius-Olsen test machine on composite bar specimens approximately 2 inches x 0.3 inch x 0.1 inch thick. Three tests were generally conducted by centerpoint loading on a bar supported on knife edges 1½ inches apart. The ultimate flexural stress was calculated utilizing the following equation:

$$F_s = 3 \ Pi/2 \ Wt^2$$

where
P=fracture load in pounds
i=inches span between knife edges
W=bar width in inches
t=bar thickness in inches

*Compression tests.*—One broken flexural test bar was machined into two 0.3 x 0.3 x 0.1 inch thick compression specimens. The test specimens were placed between two hardened steel plates and loaded to failure at a rate of 0.05 inch/minute in a Tinius-Olsen test machine.

*Wear tests.*—Wear tests were conducted by loading the narrow edge of a rectangular bar specimen 0.7 x .3 x .1 inch against a hardened 440C stainless steel (Rc 58) 2 inch diameter shaft which was rotated at 1750 r.p.m. (900 feet/minute). The wear specimen was loaded against the shaft with five pound load and maintained in contact for 100 minutes. Measurements of the wear scar width were used to calculate wear volume of the composite material.

*Friction tests.*—Friction measurements were obtained by loading a composite specimen against the periphery of a rotating 440C (Rc 58) steel disk. Measurements were made at a surface speed of 2900 feet/minute. The friction characteristics of these compositions are a function of several different factors, the most important of which are as follows:

| Factor: | General influence |
|---|---|
| Weight percent $MoS_2$ | With fixed conditions, friction decreases with increased $MoS_2$ percent. |
| Load (stress level) | The friction coefficient decreases with increased stress level. |
| Surface speed | Friction decreases with increased surface speed. |
| Mating material hardness | Friction decreases with increased surface hardness. |
| Mating material surface finish | Friction decreases with decreases in surface roughness. |
| Atmosphere | Friction decreases in the absence of air. |

The frictional characteristics also depend upon the specific elements in the metal-matrix. Addition of boron weight percentages of 4% or less have provided minimum friction values at low $MoS_2$ contents.

Wear of the composite materials is also related to the factors cited above which influence the frictional characteristics. A composition which exhibits minimum wear at one set of operating parameters (load, speed, mating material hardness, surface finish and atmosphere) probably will not exhibit minimum wear if any of these factors are changed significantly; and, in general, compositions with high $MoS_2$ percentages (above 75%) are best suited for operation at high surface speeds (to 12,000 feet/minute) and at low stress levels (under 500 p.s.i.). For operation at high stress levels (10,000 p.s.i.) and low surface speeds (10 feet/minute or less), compositions containing 20 to 50% $MoS_2$ will provide minimum wear characteristics.

I claim:
1. A solid lubricant material having a self-lubricating component contained within a refractory metal carbide matrix comprised substantially as follows:
    (a) from 20.0 to 97.0 percentage by weight of a self-lubricating component of molybdenum disulfide;
    (b) from 0.01 to 10.0 percentage by weight of a carbonaceous component substantially all of which is present in the form of metallic carbides; and
    (c) from 0.01 to 80.0 percentage by weight of a carbide-forming metallic material selected from the group consisting of molybdenum, niobium, tantalum, tungsten, and combinations thereof.
2. A solid lubricant material according to claim 1 wherein the percentage by weight of
    (a) the self-lubricating component of molybdenum disulfide is 20.0 to 97.0;
    (b) the carbonaceous medium is 0.01 to 10.0; and
    (c) the selected carbide-forming metallic material of molybdenum is 0.01 to 80.0.
3. A solid lubricant material according to claim 1 wherein the percentage by weight of
    (a) the self-lubricating component of molybdenum disulfide is 20.0 to 97.0;
    (b) the carbonaceous medium is 0.01 to 10.0; and
    (c) the selected carbide-forming metallic material of niobium is 0.01 to 80.0.
4. A solid lubricant material according to claim 1 wherein the percentage by weight of
    (a) the self-lubricating component of molybdenum disulfide is 20.0 to 97.0;
    (b) the carbonaceous medium is 0.01 to 10.0; and
    (c) the selected carbide-forming metallic material of tantalum is 0.01 to 80.0.
5. A solid lubricant material according to claim 1 wherein the percentage by weight of
    (a) the self-lubricating component of molybdenum disulfide is 20.0 to 97.0;

(b) the carbonaceous medium is 0.01 to 10.0; and
(c) the selected carbide-forming metallic material of tungsten is 0.01 to 80.0.

6. A solid lubricant material according to claim 1 wherein the percentage by weight of
(a) the self-lubricating component of molybdenum disulfide is 20.0 to 97.0;
(b) the carbonaceous medium is 0.01 to 10.0; and
(c) the selected components of the carbide-forming metallic material are molybdenum 0.01 to 80.0, and tantalum 0.01 to 80.0.

7. A solid lubricant material according to claim 1 wherein the percentage by weight of
(a) the self-lubricating component of molybdenum disulfide is 20.0 to 97.0;
(b) the carbonaceous medium is 0.01 to 10.0; and
(c) the selected components of the carbide-forming metallic material are molybdenum 0.01 to 80.0, and tungsten 0.01 to 80.0.

8. A solid lubricant material according to claim 1 wherein the percentage by weight of
(a) the self-lubricating component of molybdenum disulfide is 20.0 to 97.0;
(b) the carbonaceous medium is 0.01 to 10.0; and
(c) the selected components of the carbide-forming metallic material are molybdenum 0.01 to 80.0, niobium 0.01 to 80.0, tantalum 0.01 to 80.0, and tungsten 0.01 to 80.0.

9. A solid lubricant material having a self-lubricating component contained within a refractory metal carbide matrix comprised substantially as follows:
(a) from 20.0 to 97.0 percentage by weight of a self-lubricating component of molybdenum disulfide;
(b) from 0.01 to 10.0 percentage by weight of a carbonaceous component substantially all of which is present in the form of metallic carbides;
(c) from 0.01 to 80.0 percentage by weight of a carbide-forming metallic material selected from the group consisting of molybdenum, niobium, tantalum, tungsten, and combinations thereof; and
(d) from 0.01 to 5.0 percentage by weight of a boron component at least some of which is present in the form of a solid solution of boron.

10. A solid lubricant material according to claim 9 wherein the percentage by weight of
(a) the self-lubricating component of molybdenum disulfide is 20.0 to 97.0;
(b) the carbonaceous medium is 0.01 to 10.0;
(c) the selected carbide-forming metallic material of molybdenum is 0.01 to 80.0; and
(d) the boron component is 0.01 to 5.0.

11. A solid lubricant material according to claim 9 wherein the percentage by weight of
(a) the self-lubricating component of molybdenum disulfide is 20.0 to 97.0;
(b) the carbonaceous medium is 0.01 to 10.0;
(c) the selected carbide-forming metallic material of niobium is 0.01 to 80.0; and
(d) the boron component is 0.01 to 5.0.

12. A solid lubricant material according to claim 9 wherein the percentage by weight of
(a) the self-lubricating component of molybdenum disulfide is 20.0 to 97.0;
(b) the carbonaceous medium is 0.01 to 10.0;
(c) the selected components of the carbide-forming metallic material are tantalum 0.01 to 80.0, and tungsten 0.01 to 80.0; and
(d) the boron component is 0.01 to 5.0.

13. A solid lubricant material according to claim 9 wherein the percentage by weight of (a) the self-lubricating component of molybdenum disulfide is 20.0 to 97.0;
(b) the carbonaceous medium is 0.01 to 10.0;
(c) the selected components of the carbide-forming metallic material are niobium 0.01 to 80.0, tantalum 0.01 to 80.0, and tungsten 0.01 to 80.0; and
(d) the boron component is 0.01 to 5.0.

14. A solid lubricant material having a self-lubricating component contained within a refractory metal carbide matrix comprised substantially as follows:
(a) from 45.0 to 90.0 percentage by weight of a self-lubricating component of molybdenum disulfide;
(b) from 0.01 to 10.0 percentage by weight of a carbonaceous component substantially all of which is present in the form of metallic carbides;
(c) from 2.0 to 55.0 percentage by weight of a carbide-forming metallic material selected from the group consisting of molybdenum, niobium, tantalum, tungsten, and combinations thereof; and
(d) from 0.1 to 53.0 percentage by weight of a metallic material for lubrication during fabrication selected from the group consisting of iron, nickel, chromium, cobalt, and combinations thereof.

15. A solid lubricant material according to claim 14 wherein the percentage by weight of
(a) the self-lubricating component of molybdenum disulfide is 45.0 to 90.0;
(b) the carbonaceous medium is 0.01 to 10.0;
(c) the selected carbide-forming metallic material of tantalum is 2.0 to 55.0; and
(d) the selected metallic material of iron is 0.1 to 53.0.

16. A solid lubricant material according to claim 14 wherein the percentage by weight of
(a) the self-lubricating component of molybdenum disulfide is 45.0 to 90.0;
(b) the carbonaceous medium is 0.01 to 5.0;
(c) the selected carbide-forming metallic material of tantalum is 2.0 to 55.0; and
(d) the selected metallic material of nickel is 0.1 to 53.0.

17. A solid lubricant material according to claim 14 wherein the percentage by weight of
(a) the self-lubricating component of molybdenum disulfide is 45.0 to 90.0;
(b) the carbonaceous medium is 0.01 to 10.0;
(c) the selected carbide-forming metallic material of tantalum is 2.0 to 55.0; and
(d) the selected metallic material of chromium is 0.1 to 53.0.

18. A solid lubricant material according to claim 14 wherein the percentage by weight of
(a) the self-lubricating component of molybdenum disulfide is 45.0 to 90.0;
(b) the carbonaceous medium is 0.01 to 5.0;
(c) the selected carbide-forming metallic material of tantalum is 2.0 to 55.0; and
(d) the selected metallic material of cobalt is 0.1 to 53.0.

References Cited

UNITED STATES PATENTS

| | | | |
|---|---|---|---|
| 1,714,564 | 5/1929 | Koehler | 252—12 |
| 2,250,099 | 7/1941 | Hensel | 252—12 |
| 2,823,147 | 2/1958 | Ward | 252—12 |
| 3,051,586 | 8/1962 | Heath | 252—12 |
| 3,239,288 | 3/1966 | Campbell et al. | 252—12 |

DANIEL E. WYMAN, Primary Examiner

I. VAUGHN, Assistant Examiner